US012393671B2

(12) United States Patent
Vasilakis

(10) Patent No.: US 12,393,671 B2
(45) Date of Patent: Aug. 19, 2025

(54) PRIVILEGE METRIC FOR EVALUATING THE SECURITY OF A LIBRARY

(71) Applicant: Massachusetts Institute of Technology, Cambridge, MA (US)

(72) Inventor: Nikolaos Vasilakis, Somerville, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 487 days.

(21) Appl. No.: 18/051,084

(22) Filed: Oct. 31, 2022

(65) Prior Publication Data

US 2023/0139429 A1     May 4, 2023

Related U.S. Application Data

(60) Provisional application No. 63/273,912, filed on Oct. 30, 2021.

(51) Int. Cl.
| H04L 29/06 | (2006.01) |
| G06F 21/45 | (2013.01) |
| H04L 9/40 | (2022.01) |

(52) U.S. Cl.
CPC .......... G06F 21/45 (2013.01); H04L 63/0869 (2013.01); G06F 2221/2141 (2013.01)

(58) Field of Classification Search
CPC ............ G06F 21/45; G06F 2221/2141; H04L 63/0869
See application file for complete search history.

(56) References Cited

U.S. PATENT DOCUMENTS

2021/0365849 A1* 11/2021 Kamen ................ G16H 70/40
2022/0342965 A1* 10/2022 Watanabe ........... G06F 11/3438

* cited by examiner

*Primary Examiner* — Evans Desrosiers
(74) *Attorney, Agent, or Firm* — Nieves IP Law Group, LLC; Peter A. Nieves

(57) ABSTRACT

A privilege metric application quantifies a privilege reduction for a subject software module $M_S$. Target critical resources $M_t$ accessible by the subject module are identified. Permissions $P(M_S, M_t)$ for the subject module to access each of the target critical resources as a result of the privilege reduction are determined. Default library permissions $P_{base}(M_S, M_t)$ without the privilege reduction are determined. A metric regarding the vulnerability reduction of $P(M_S, M_t)$ with respect to $P_{base}(M_S, M_t)$ is quantified.

12 Claims, 5 Drawing Sheets

FIG. 3

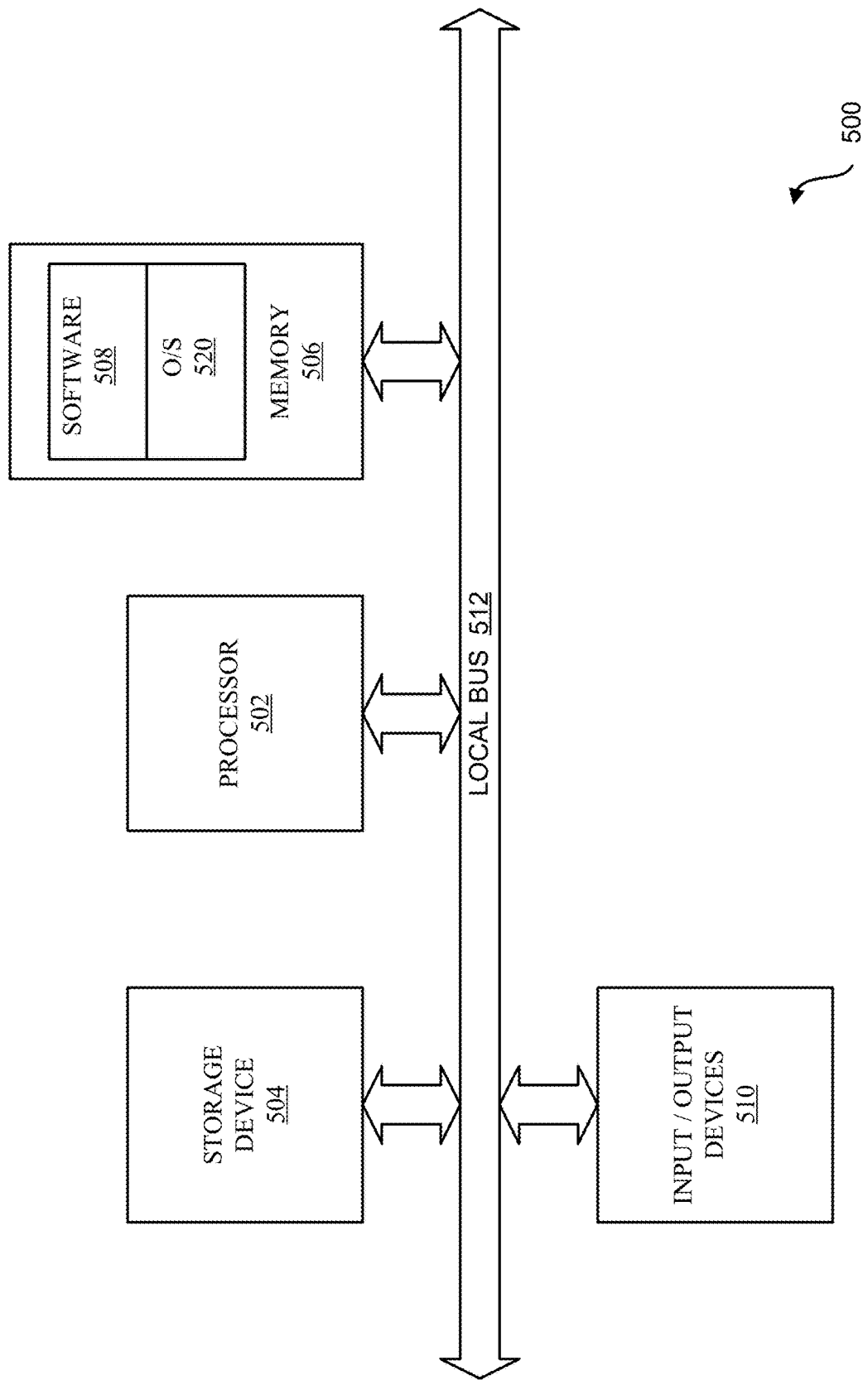

PRIVILEGE METRIC FOR EVALUATING THE SECURITY OF A LIBRARY

CROSS-REFERENCE TO RELATED APPLICATIONS

This application claims the benefit of U.S. Provisional Patent Application Ser. No. 63/273,912, filed Oct. 30, 2021, entitled "Privilege Metric for Evaluating the Security of a Library," which is incorporated by reference herein in its entirety.

GOVERNMENT LICENSE RIGHTS

This invention was made with Government support under Grant No. HR0011-20-C-0191 and HR0011-20-2-0013 awarded by the Defense Advanced Research Projects Agency (DARPA). The Government has certain rights in the invention.

FIELD OF THE INVENTION

The present invention relates to computer privacy, and more particularly, is related to evaluating security of library permissions in a software application.

BACKGROUND OF THE INVENTION

Computer applications use several dozens or even hundreds of libraries created by many different authors and accessed via public repositories. The heavy use of libraries is particularly common in JavaScript applications, and especially in those running on the Node.js platform, where developers have access to millions of libraries through a node package manager (npm). Reliance on libraries introduces the risk of dynamic compromise, i.e., the runtime exploitation of a benign library via library inputs, affecting the security of the entire application and its broader operating environment. For example, consider a (de)serialization library that uses JavaScript's built-in eval function to parse a string into a runtime object, as shown in Table 1.

TABLE 1

Example of an application routine (left) calling
a library deserialization function (right)

| let srv = (req, res) => { | let lg = require("log"); |
| let slr, obj; | lg.LVL = lg.levels.WARN; |
| srl = require("serial"); | module.export = { |
| obj = srl.dec(req.body): | dec: (str) => { |
| rout(obj, res); | let obj: |
| } | lg.info("srl:dec"); |
|  | Obj = eval(str); |
| let rout = (...) => {...} | return obj |
|  | }, |
|  | enc: (obj) => {...} |
|  | } |

Here, an off-the-shelf serialization implemented by a serial third-party module (Table 1, right column), is vulnerable to remote code execution by the calling routine (Table 1, left column). While the library itself is benign, accessing no other external API apart from eval, an attacker may pass a malicious serialized object to the deserialization function, where the deserialization function will in turn will pass malicious serialized object to eval. As a result, the library may be subverted into malicious behavior, e.g., accessing the file system or the network, that goes far beyond what a (de)serialization library is intended to do. The underlying problem is that each library running on Node.js has all privileges offered by the JavaScript language and its runtime environment. In particular, each library is allowed to access any built-in API, global variables, APIs of other imported libraries, and even import additional libraries.

FIG. 1 is a schematic diagram illustrating the full source code 100 of a computer application, including application specific code 110, trusted libraries 120, 122, 124, and third party (untrusted) libraries. 130-134. For example, the trusted libraries 120, 122, 124 may have been provided by the developer of the application specific code 110, and may include an encryption library 120, a hash library 122, and a math library 124. The application may also access third party libraries 130-134, where the third party libraries may have vulnerabilities that may be exploited via the application interface. For example, the application developer may not be aware of known or unknown vulnerabilities, privileges, sensitive operations, and/or resource usage by the third party libraries 130-134.

Various methods may reduce the privileges of subject modules accessing critical resources. Such methods attempt to reduce the risk of dynamic compromise by specifying and enforcing the privilege available to libraries to permit a library to access only the functionality that it really needs. This prevents attackers from subverting library access into behavior that goes beyond its intended behavior.

Any such method—whether created automatically or manually—on existing programs should preferably strike a balance between compatibility and security: an ideal policy would allow only the necessary accesses but no more. Unfortunately, statically inferring such an ideal policy in the context of any language is known to be undecidable, making it difficult to quantitatively evaluate the security benefits offered by such methods. Therefore, there is a need in the industry to address one or more of the above mentioned shortcomings.

SUMMARY OF THE INVENTION

Embodiments of the present invention provide a method for determining a privilege metric for evaluating security of a library. Briefly described, the present invention is directed to a privilege metric application that quantifies a privilege reduction for a subject software module $M_S$. Target critical resources $M_t$ accessible by the subject module are identified. Permissions $P(M_S, M_t)$ for the subject module to access each of the target critical resources as a result of the privilege reduction are determined, and default library permissions $P_{base}(M_S, M_t)$ without the privilege reduction are determined. A metric regarding the vulnerability reduction of $P(M_S, M_t)$ with respect to $P_{base}(M_S, M_t)$ is quantified.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 5 is a schematic diagram illustrating an example of a system for executing functionality of the present invention.

DETAILED DESCRIPTION

Figure 1:
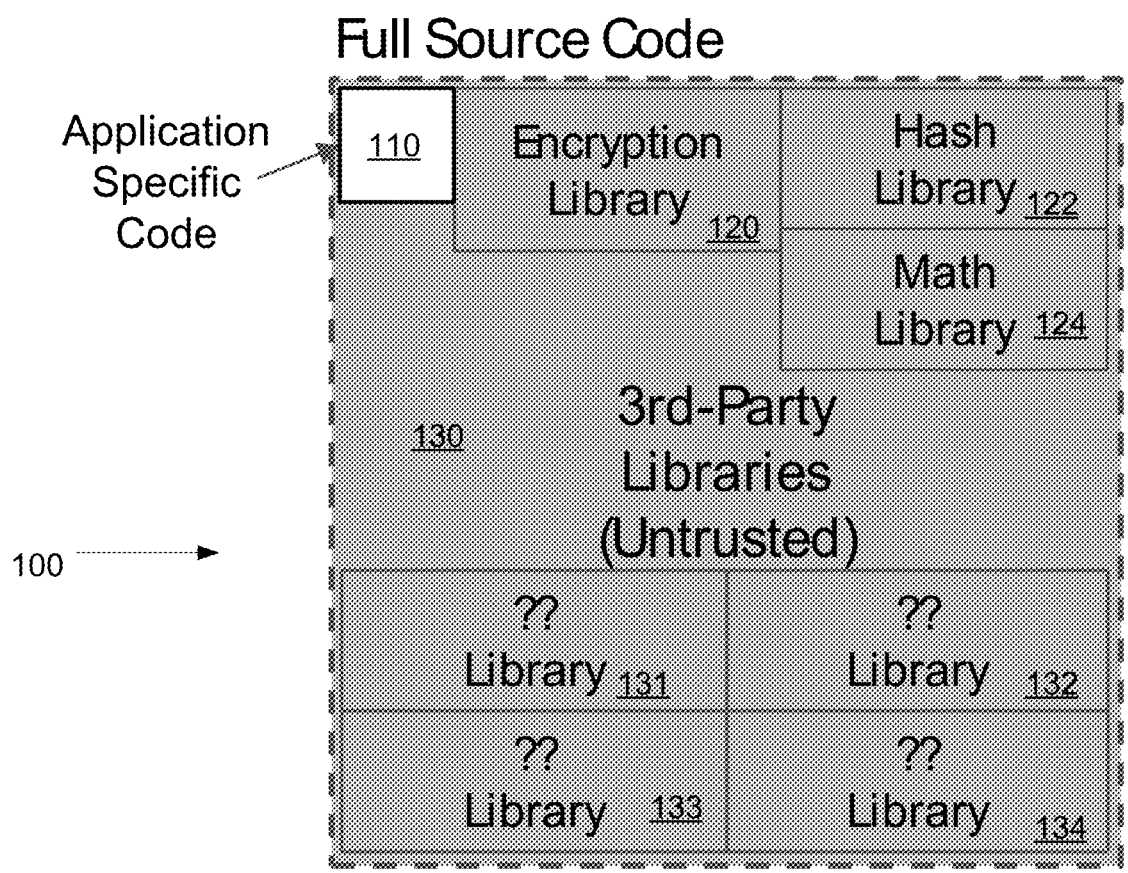
FIG. 1 is a schematic diagram illustrating the full source code 100 of a computer application.

The following definitions are useful for interpreting terms applied to features of the embodiments disclosed herein, and are meant only to define elements within the disclosure.

As used within this disclosure, a "library" refers to a collection of files, programs, routines, scripts, or functions that can be referenced in the programming code by a computer application. It should be noted the terms library, module, and package may be used interchangeably herein.

As used within this disclosure, a "permission" is a property of an object, such as a file. It says which agents are permitted to use the object, and what they are permitted to do (read it, modify it, etc.). These are often referred to ax RWX, where R stands for "read," W stands for "write," and X stands for "execute." These may be summarized as follows:

A read permission (R) grants clients the ability to read a value, including assigning it to variables and passing it around to other modules.

A write permission (W) grants clients the ability to modify a value, and includes the ability to delete it. The modification will be visible by all modules that have read permissions over the original value.

An execute permission (X) grants clients the ability to execute a value, provided that it points to an executable language construct, such as a function or a method. It includes the ability to invoke the value as a constructor (typically prefixed by new).

The related term, "privilege" is a property of an agent, such as a user, and determines the access of the agent to specific objects, for example, based on the permissions of the object. A "privilege reduction" action reduces the number of, or types of agents granted permissions to access an object.

As used within this disclosure, "library privilege (security) metric" refers to a ratio of interfaces available to the library. The metric may be used to calculate how much damage may be caused by misuse of the library. For example, given a car, with an API of 5 functions (accelerator, break, clutch, handbrake, steering wheel), if the driver only has permission to use two of the five functions ( ~~accelerator~~ , break, clutch, ~~handbrake~~ , ~~steering wheel~~ ), the amount of damage the driver could cause may be limited, here by reducing the likelihood the driver could crash the car if the only driver permitted actions involve lowering the speed. For this example, this is a ratio 2/5 privilege of a library/module, and (5−2)/5 privilege reduction metric.

A "privilege reduction definition" refers to a ratio of interfaces allowed by a privilege reduction system over a full set of interfaces available to an application program.

As used within this disclosure, a "whitelisted" agent or object is an agent or object that that full RWX privileges/permissions.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention provide a metric to quantitatively evaluate the security benefits offered when analyzing privilege reduction methods. Described at a high level, the embodiments calculate single-library privilege reduction as the ratio of disallowed permissions over the full set of permissions available by default within the lexical scope of the library. The embodiments determine a default permission set by statically expanding all names available in scope. The disallowed set of permissions is calculated by subtracting the allowed permissions from the default permission set. Single-library privilege reductions across the full dependency tree are then combined into a single reduction metric for a program and its dependencies.

A privilege reduction system produces a privilege reduction definition to reduce the vulnerability of a computer application to exploitation. The exemplary embodiments are configured to produce a metric to indicate the effectiveness of the privilege reduction definition without having to perform extensive testing of the privilege reduction definition.

The following paragraphs describe the embodiments in detail. To assist in understanding the embodiments, the description refers to the third party deserialization library function of Table 1. One having ordinary skill in the art would appreciate that the following is provided for exemplary purposes and the present invention is not intended to be limited to this example.

Under a first exemplary embodiment, a privilege metric application receives one or more subject modules $M_s$, for quantifying their privilege. The privilege metric application further receives one or more target critical resources $M_t$ that may be potentially accessed by the subject modules.

Assume that from the two modules presented in Table 1, only the privilege of the calling function main is to be quantified, thus, $M_s=\{main\}$. The set of critical resources contains many paths available to main. For simplicity, now assume the paths only contains globals, fs, and require; thus, $M_t=\{globals, fs, require\}$. Module main needs an X (execute) permission on require to be able to load serial, and an X permission on serial.dec to be able to call the dec function. With this simple configuration, the present system disallows all accesses except for $$P(M_s, M_t) = \{ \langle \text{require}, X \langle , \rangle \text{serial.dec}, X \rangle \} \qquad \text{(Eq. 1)}$$

The privilege metric application quantifies this privilege with respect to the permissions available to a library by default. If main was executed without additional protection, its privilege would be $$P_{base}(M_s, M_t) = \{ \langle \text{globals.*}, RWX \rangle, \langle \textit{fs}.\text{read}, RWX \rangle, \ldots \} \qquad \text{(Eq. 2)}$$

More formally, by default, at runtime any module has complete privilege on all exports of any other module. Thus, for any modules m1, m2 the baseline privilege that m1 has on m2 is:

$$P_{base}(m_1, m_2) = \{ \langle \alpha, \mu \rangle \mid \alpha \in API_{m2}, \mu \in Mode \} \qquad \text{(Eq. 3)}$$

where $\mu \in$ Mode is a set of orthogonal permissions on a resource, which for the present system and method is P={R,W,X}. The name α can be any field that lies arbitrarily deeply within the values exported by another module.

The privilege metric application reduces privilege by disallowing all but the whitelisted permissions at module boundaries:

$$PS(m_1,m_2)=\{\langle \alpha,\mu \rangle | \alpha \in API_{m_2}, S \text{ gives } m_1\mu \text{ on } \alpha\} \quad \text{(Eq. 4)}$$

To calculate the privilege reduction across a program that contains several different modules, the privilege metric application compiles the privilege definition to a set of subject and target modules:

$$P(M_s,M_t)=m_1 \in M_s m_2 \in M_t P(m_1,m_2) \quad \text{(Eq. 5)}$$

Based on this, the privilege metric application defines the privilege reduction, a metric of the permissions restricted by a privilege-reducing system S, such as in the present system:

$$PR(M_s,M_t)=[|P_{base}(M_s,M_t)|]/[|P_S(M_s,M_t)|] \quad \text{(Eq. 6)}$$

A higher reduction factor implies a smaller attack surface since the subjects are given privilege to a smaller portion of the available resources. $P_{base}$ is an under-approximation of base privileges, as a source module can, in principle, import and use any other module that is installed in the execution environment. Consequently, the measured privilege reduction is actually a lower bound of the privilege reduction that the privilege metric application achieves in practice.

The routine main (Table 1) is not allowed to directly call eval; however, main can call eval indirectly by executing serial.dec. Accurately quantifying such transitive privilege involves tracking transitive calls across such boundaries, which typically involves heavyweight information flow analysis. The privilege metric application privilege reduction quantification does not attempt such an analysis to keep runtime overheads low. As a result, estimate of the privilege metric application is necessarily conservative, that is, the privilege metric application reports a lower number than may be achieved in practice.

Figure 2:
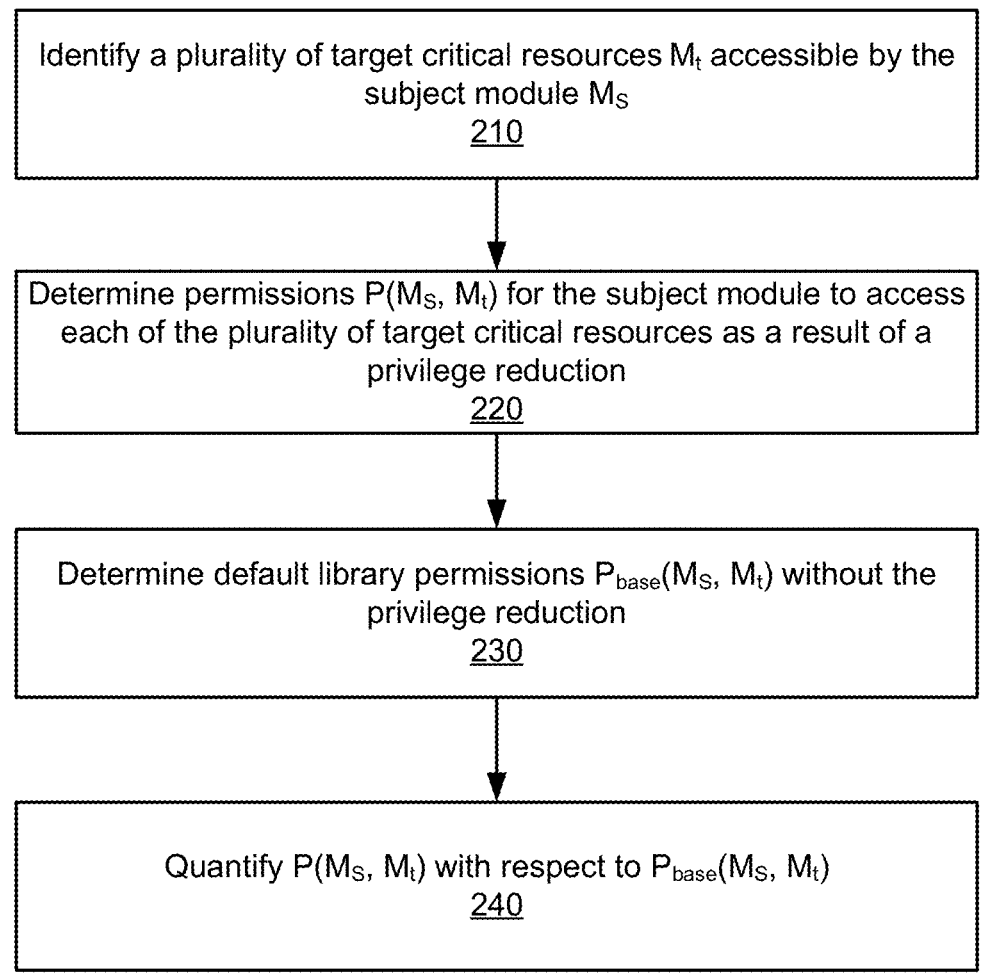
FIG. 2 is a flowchart of an exemplary method embodiment for quantifying a privilege reduction for a subject module.

FIG. 2 is a flowchart 200 of an exemplary method for a privilege metric application quantifying a privilege reduction for a subject module. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A plurality of target critical resources $M_t$ accessible by the subject module $M_S$, is identified, as shown by block 210. For a non-limiting example, libraries and resources identified in the header of source files of the subject module $M_S$ or otherwise included in the source files of the subject module $M_S$ may be compared against a predetermined list of critical resources and/or whitelisted resources. Libraries/resources not included as identified critical or whitelisted resources may be flagged for further investigation, for example, to determine whether they should be added to either the critical resources list or the whitelist. Permissions $P(M_S, M_t)$ for the subject module to access each of the plurality of target critical resources as a result of the privilege reduction are determined, as shown by block 220. For a non-limiting example, the permissions $P(M_S, M_t)$ for the subject module may be checked against a predetermined list of permissions, or may be checked against present operating system permissions, for example, via executing a script. Similarly, default library permissions $P_{base}(M_S, M_t)$ without the privilege reduction are determined, as shown by block 230. $P(M_S, M_t)$ is defined with respect to $P_{base}(M_S, M_t)$, as shown by block 240.

Figure 3:
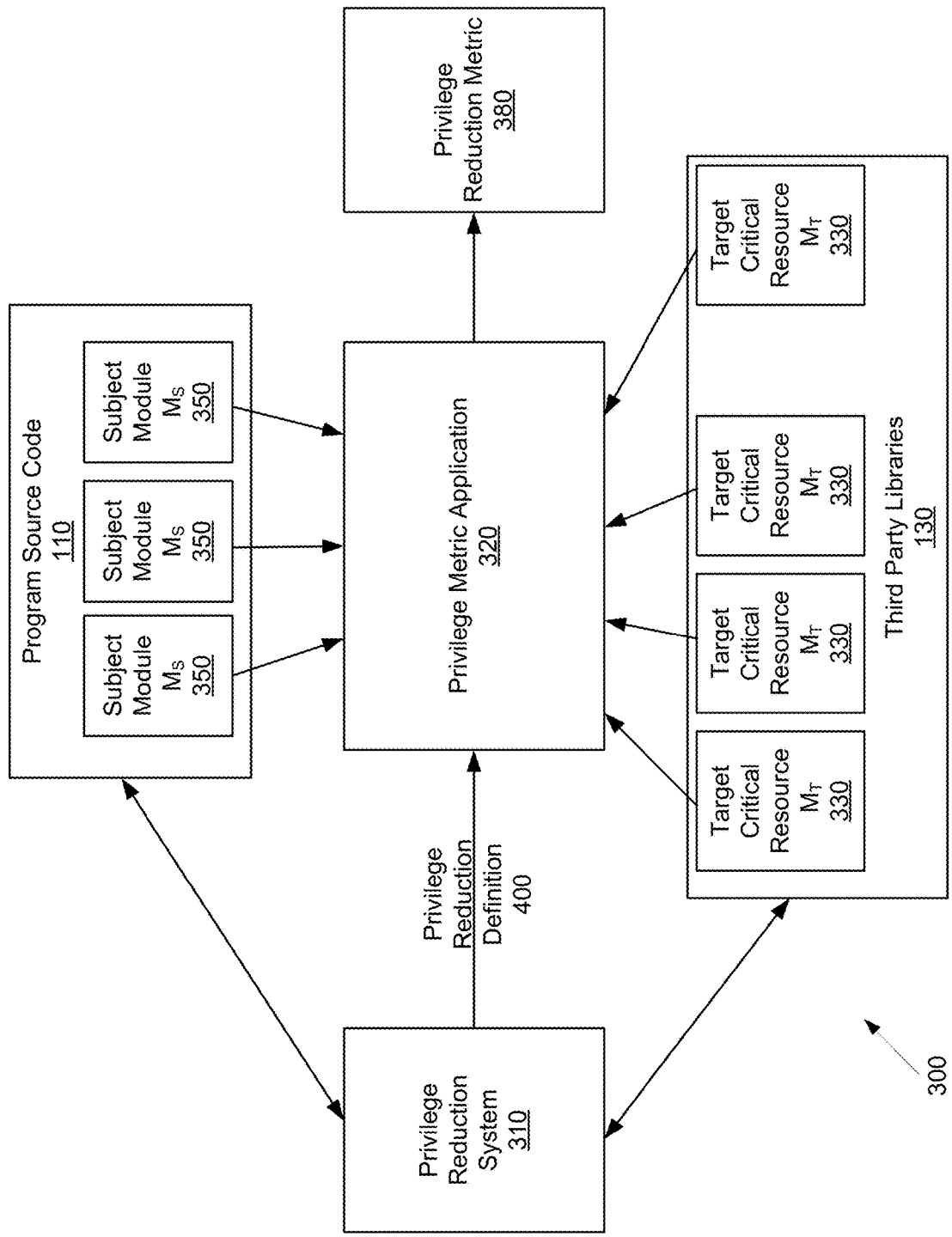
FIG. 3 is a block diagram for an exemplary embodiment of a system of a privilege metric application.
Figure 4:
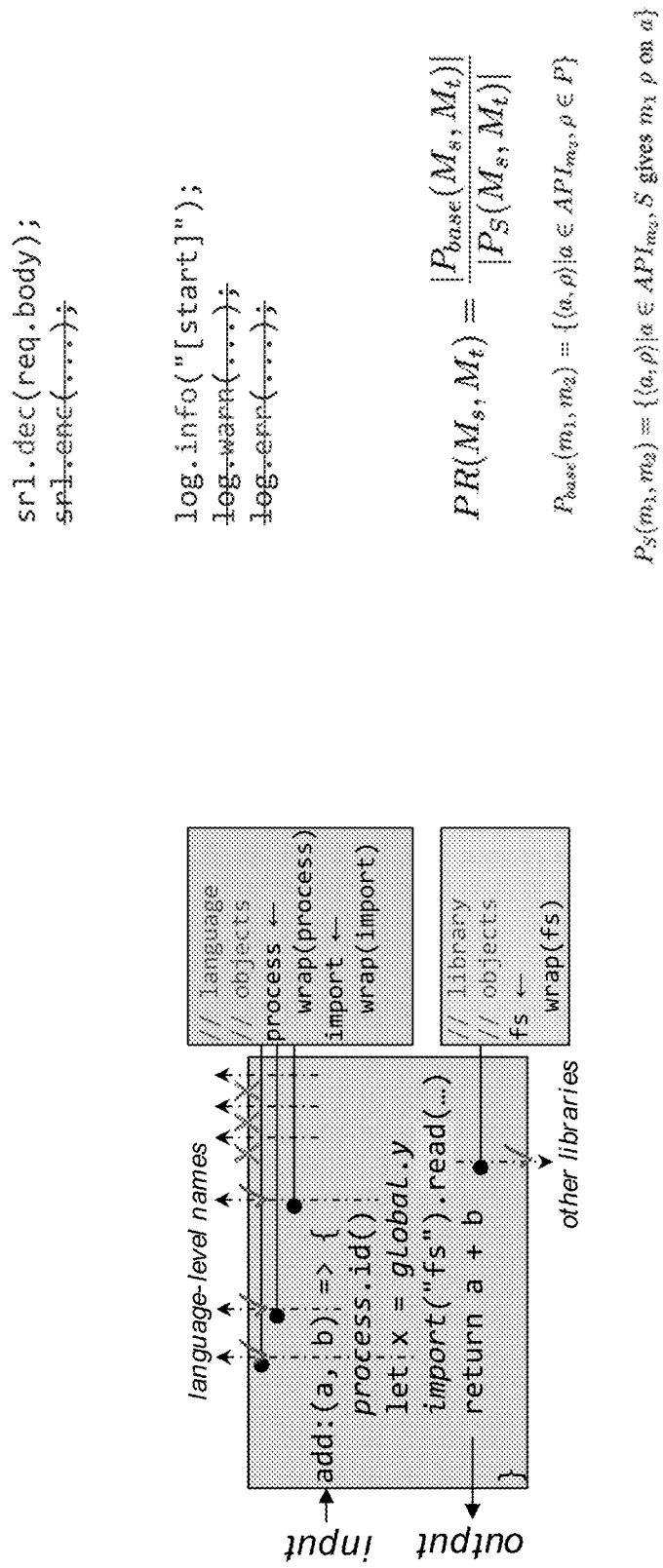
FIG. 4 shows an example of a privilege reduction definition used by the system of FIG. 3.

FIG. 3 is a block diagram for an exemplary embodiment of a system 300 for a privilege metric application 320. A privilege reduction system 310 analyzes the privileges of software component and produces a privilege reduction definition 400 (see FIG. 4) that adjusts privileges/permissions in modules 350 of the source code 110 with respect to resources 330 in third party libraries 130 to reduce vulnerability to exploitation. The privilege metric application 320 may be a component of the privilege reduction system 310 or may be separate. The privilege metric application 320 receives the privilege reduction definition 400 and the privileges/permission of the subject modules 350 of the source code 110 and the target critical resources 330 of the third party libraries 130. The privilege metric application 320 applies the method embodiment 200 (FIG. 2, described above) and produces a privilege reduction metric 380 according to the privilege reduction definition 400. The privilege metric application 320 determines a baseline library privilege (security) metric to determine the security improvement represented by the privilege reduction definition 400.

One having ordinary skill in the art will appreciate that privilege metric application 320 may be performed by modules within a general computer system, server, or any system contain a memory and a processor. For exemplary purposes, FIG. 5 is a schematic diagram illustrating a system containing a memory that would have the modules described herein.

The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semi-conductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention, as described above with reference to the modules. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above. When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for providing a privilege reduction metric quantifying a privilege reduction definition provided by a privilege reduction system for a subject module $M_S$, comprising:
   program source code comprising a plurality of modules;
   a plurality of third party libraries; and
   a processor and a memory configured to store non-transitory instructions that, when executed by the processor, run a privilege metric application configured to:
      identify a plurality of target critical resources $M_t$ accessible by the subject module;
      determine permissions $P(M_S, M_t)$ for the subject module to access each of the plurality of target critical resources as a result of the privilege reduction;
      determine default library permissions $P_{base}(M_S, M_t)$ without the privilege reduction; and
      quantify a metric regarding the vulnerability reduction of $P(M_S, M_t)$ with respect to $P_{base}(M_S, M_t)$.

2. The system of claim 1, wherein for the default library permissions any module has complete permissions on all exports of any other module.

3. The system of claim 1, wherein the run privilege application is further configured to disallow all but whitelisted permissions at boundaries of the subject module.

4. The system of claim 3, wherein the run privilege application is further configured to compile a privilege definition to a set of subject and target modules.

5. The system of claim 1, wherein the run privilege application is further configured to receive a definition of the privilege reduction.

6. The system of claim 5, wherein the privilege reduction comprises a metric of the permissions restricted by a privilege-reducing system.

7. A method by a computer based privilege metric application for quantifying a privilege reduction for a subject module $M_S$, comprising the steps of:
   identifying a plurality of target critical resources $M_t$ accessible by the subject module;

determining permissions $P(M_S, M_t)$ for the subject module to access each of the plurality of target critical resources as a result of the privilege reduction;

determining default library permissions $P_{base}(M_S, M_t)$ without the privilege reduction; and quantifying a metric regarding the vulnerability reduction of $P(M_S, M_t)$ with respect to $P_{base}(M_S, M_t)$.

8. The method of claim 7, wherein for the default library permissions any module has complete permissions on all exports of any other module.

9. The method of claim 7, further comprising the step of disallowing all but whitelisted permissions at boundaries of the subject module.

10. The method of claim 9, further comprising the step of compiling a privilege definition for a set of subject and target modules.

11. The method of claim 7, further comprising the step of receiving a definition of the privilege reduction.

12. The method of claim 11, wherein the privilege reduction comprises a metric of the permissions restricted by a privilege-reducing system.

* * * * *